United States Patent [19]

Moir

[11] Patent Number: 5,113,442
[45] Date of Patent: May 12, 1992

[54] METHOD AND APPARATUS FOR PROVIDING ACCESS CONTROL IN A SECURE OPERATING SYSTEM

[75] Inventor: Dale A. Moir, Naperville, Ill.

[73] Assignee: Lachman Associates, Inc., Naperville, Ill.

[21] Appl. No.: 319,345

[22] Filed: Mar. 6, 1989

[51] Int. Cl.$^5$ .............................................. H04L 9/32
[52] U.S. Cl. ......................................... 380/25; 380/4; 380/23; 380/49; 340/825.31; 340/825.34
[58] Field of Search ...................... 380/28, 49, 21, 23, 380/25, 44, 45, 50, 3, 4; 364/709.05, 223.5 MS File, 224 MS File, 224.4 MS File, 286.5 MS File; 340/825.3, 825.31, 825.34

[56] References Cited

U.S. PATENT DOCUMENTS 4,644,543 2/1987 Davis, Jr. ......................... 364/200 X
4,658,292 4/1987 Okamoto et al. .................. 380/21 X

OTHER PUBLICATIONS

Kramer, Steven M., "On Incorporating Access Control Lists into the UNIX Operating System", USENIX Proceedings, UNIX Security Workshop, Aug. 29-30, 1988, pp. 38-48.

Downs, Deborah D. et al., "Issues In Discretionary Access Control," IEEE, Jan. 1985, pp. 208-218.
Jordan, Carole S., "A Guide To Understanding Discretionary Access Control In Trusted Systems," National Computer Security Center (NCSC-TG-003, Version 1), Sep. 30, 1987.
Silverstein, Alan et al., "Adding Access Control Lists to UNIX," Hewlett-Packard Company, Mar. 12, 1988.

*Primary Examiner*—Bernarr E. Gregory
*Attorney, Agent, or Firm*—Leydig, Voit & Mayer

[57] ABSTRACT

A method, and an operating system utilizing this method, for controlling access rights among a plurality of users to a plurality of secure objects. Each user is provided a user identification number which is prime and each secure object is provided an access code which comprises a value that is a product of the user identification numbers of all users having the same access rights to that secure object. In response to a request by a user for access to a secure object, the access code for that secure object is divided by the user identification number of the requesting user. Access rights of the user to the requested secure object are determined based on whether the result of the division yields a zero remainder.

23 Claims, 7 Drawing Sheets

|  | OBJECT 1 | OBJECT 2 | ... | OBJECT N |
|---|---|---|---|---|
| USER 1 | – – – | – w – |  | r w – |
| USER 2 | r w x | r – – |  | – – x |
| • |  |  |  |  |
| • |  |  |  |  |
| • |  |  |  |  |
| USER M | r – – | r w – |  | r – – |

FIG. 1a
(PRIOR ART)

| USER 1 | OBJECT 2, – w – | OBJECT 6, r – – | ... | OBJECT N, r w – |
|---|---|---|---|---|

FIG. 1b
(PRIOR ART)

| OBJECT 1 | USER 2, r w x | USER 4, – w – | ... | USER M, r – – |
|---|---|---|---|---|

FIB. 1c
(PRIOR ART)

FIG. 5 ACCESS DETERMINATION SEQUENCE

METHOD AND APPARATUS FOR PROVIDING ACCESS CONTROL IN A SECURE OPERATING SYSTEM

TECHNICAL FIELD

The present invention relates generally to an operating system having a plurality of secure objects and, more particularly, to a method and apparatus for providing access control to those secure objects among a plurality of users.

BACKGROUND ART

A typical computer operating system includes a variety of different resources ("objects"), such as data storage devices, programs, modems and hardware (e.g., printing devices). Each of these objects may be accessed by system users through one or more limited access permissions ("modes"). For example, a user may read information stored in a data file by means of a "read" mode, and may add information to, or delete information from, the data file by means of "write" and "delete" modes, respectively. Similarly, a "copy" mode allows a user to copy a program or file, while an "execute" mode allows a user to use the program or file, but not copy it.

In a multi-user environment, it is desirable to control access to the available system objects among the plurality of users, such that some of the objects are "open" (i.e., accessible to all users in all available modes) while others are "secure" (i.e., accessible to only a predetermined segment of the user population).

In very simple systems, each user is provided a respective "identifier" or "password", while each of the secure objects has an associated "tag" or "information node" which identifies, among other things, the single user to which the object belongs. Thus, only the user that "owns" the object may gain access to it.

However, in modern computer systems it is common for different users to share secure objects among themselves. For example, a user may wish to selectively allow other users to read, write or delete, etc., a secure object that he or she owns. A common method of allowing or denying access to each secure object on a per-user basis is through the use of "classical" access control list implementations.

Figure 1A:
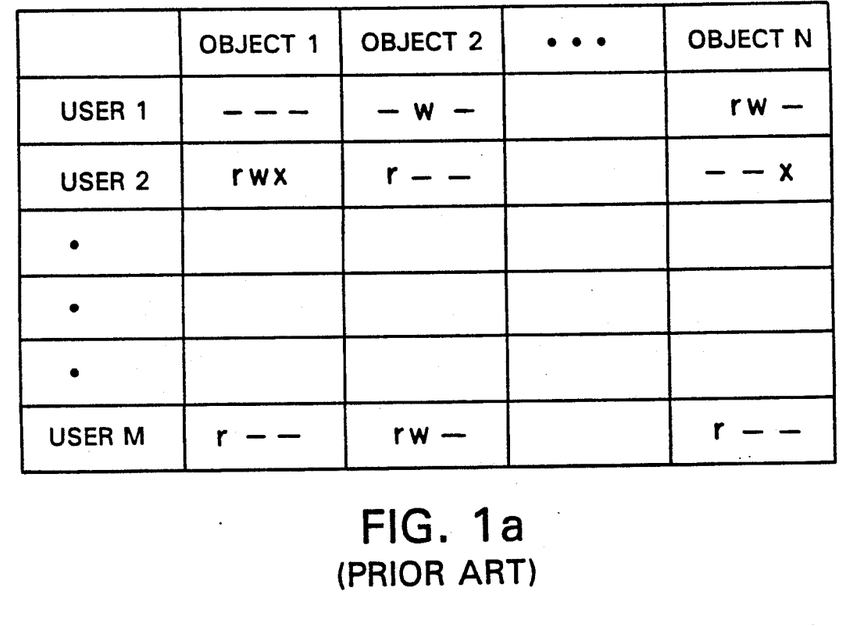
FIG. 1A is a diagram of a conventional matrix access control list.

As shown in FIG. 1A, a first implementation of an access control list may comprise a matrix defining the set of users and the set of available objects, with appropriate access permissions indicated at predetermined addresses of the matrix. Thus, in accordance with the access control matrix of FIG. 1A, USER1 can access OBJECT2 with "write" permission only, USER2 can access OBJECT1 with "read", "write" or "execute" permission, and so on.

As alternatives to an access control matrix, user-based access control lists (FIG. 1B)—which associates with each user a list of objects that the user can access, and with what permission—and object-based access control lists (FIG. 1C)—which associate with each object a list of users that may access that object, and with what permissions—have been utilized.

While the above-described "classical" access control lists are effective means for controlling access to secure objects in multi-user systems, they are expensive to implement since both computer time and data storage space are very expensive. The matrix implementation of FIG. 1A is attractive timewise since the time needed to locate a unique matrix address is very small, but is not efficient spacewise. Since most users in a "secure" system do not have access to most files, many of the entries in an access control matrix are blank. This is very inefficient.

Figure 1B:
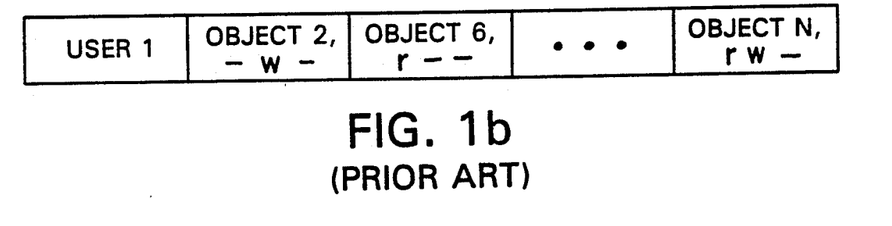
FIG. 1B is a diagram of a conventional user-based access control list.

In contrast, the individual list implementations of FIGS. 1B and 1C are attractive spacewise since "blank" entries are not stored, but are inefficient timewise since list searching is, by its very nature, more time consuming than the simple address calculation offered by the matrix implementation. In short, the two "classical" implementations of access control lists offer a time/space trade-off.

Furthermore, adding a user or object in these "classical" implementations requires creation of either a new list or matrix row/column, and modifying access permissions requires matrix update or list manipulation. All of these actions require significant computational overhead.

SUMMARY OF THE INVENTION

It is a primary object of the present invention to provide an improved method in an operating system for controlling access rights to secure objects which requires minimal memory space and evaluates access requests very quickly and, thus, is inexpensive to use.

It is another object of this invention to provide such an access control method in which user and administrative access are easily separated.

A further object of this invention is to provide such an access control method which allows simple modification to reflect desired changes in access permissions.

Another object of this invention is to provide an access control system which requires very little hardware and is inexpensive to implement.

Other objects and advantages of the invention will be apparent from the following detailed description.

In accordance with the present invention, there is provided a method, and an operating system utilizing this method, for controlling access rights among a plurality of users to a plurality of secure objects. Each user is provided a user identification number which is prime and each secure object is provided an access code which comprises a value that is a product of the user identification numbers of all users having the same access rights to that secure object. In response to a request by a user for access to a secure object, the access code for that secure object is divided by the user identification number of the requesting user. Access rights of the user to the requested secure object are determined based on whether the result of the division yields a zero remainder.

BRIEF DESCRIPTION OF THE DRAWINGS

FIG. 1C is a diagram of a conventional object-based access control list.

DESCRIPTION OF THE PREFERRED EMBODIMENT

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

Figure 2:
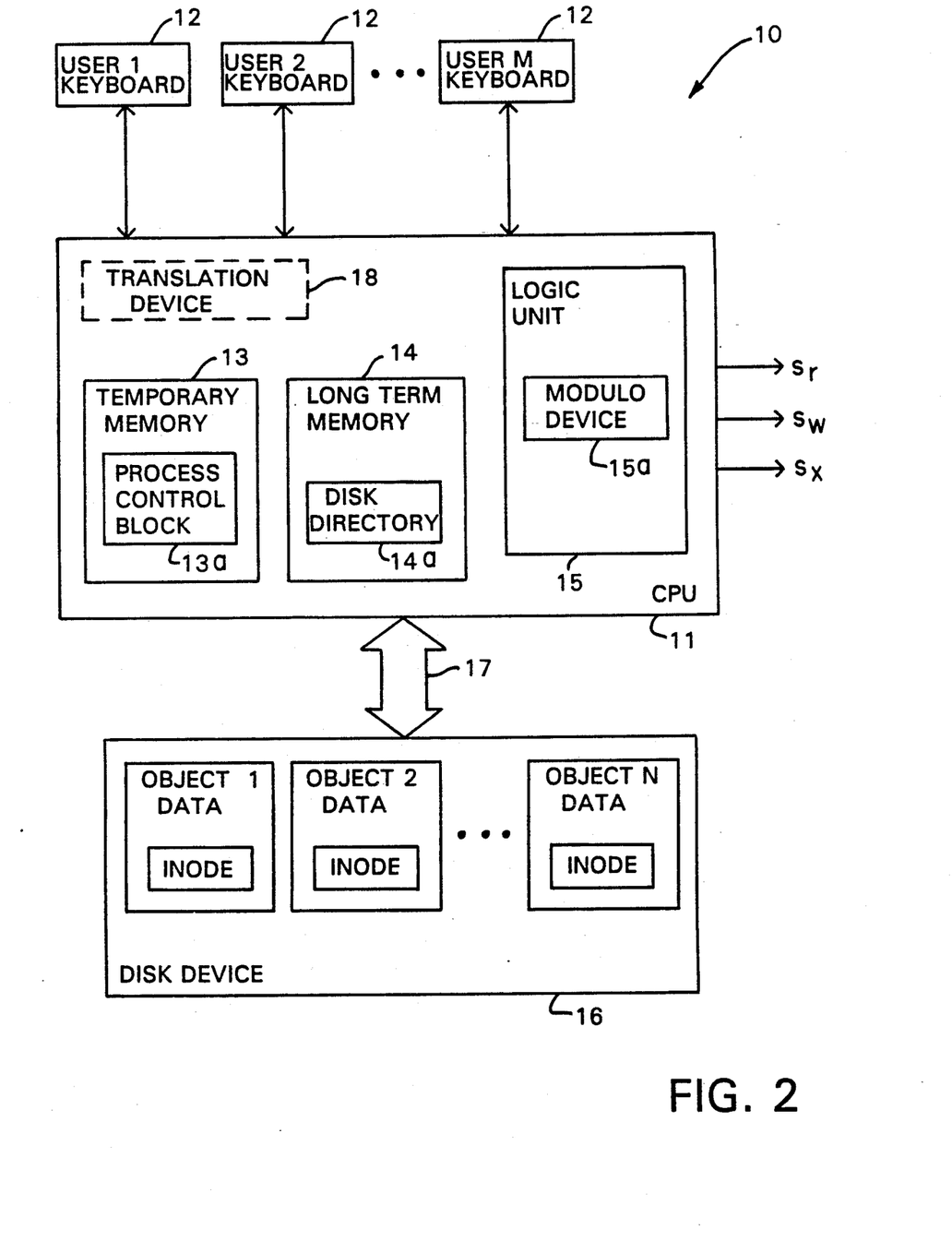
FIG. 2 is a schematic diagram of the access control operating system of the present invention.

Turning now to the drawings and referring first to FIG. 2, there is shown an operating system 10 for controlling access to a plurality of secure objects among a plurality of users. This system includes a central processing unit (CPU) 11, which the users communicate with via a plurality of keyboards 12 at microprocessor substations. The CPU 11 has both temporary and long term data storage (13 and 14, respectively), the former including a process control block 13a for storing information about each active user process and the latter including a disk directory 14a for storing disk address information relating to each of the secure objects. In addition, the CPU has a logic unit 15, including a modulo device 15a, for evaluating the access requests of the users and generating responsive access control signals ($S_R$, $S_W$, $S_X$).

A disk device 16, which contains information relating to each of the secure objects, is connected to the CPU via a data bus 17. More specifically, the disk device 16 includes blocks of data located at different disk addresses, each data block relating to a specific secure object. Included in the data for each secure object is a "tag" or "information node" (inode). Each inode identifies the user the object belongs to and the disk address of the data block, among other things, and, as is conventional in the art, includes information regarding access mode permissions for the secure object. Thus, for example, in a "classical" access control system, an access control list (or list pointer) constitutes a segment of the inode data.

Typically, each user is identifiable to an operating system by means of a unique password, consisting of a string of characters. Most systems use passwords for "external" use only (i.e., as login names for the users), and map a user identifier (UID), which is a unique integer number, to each password to represent the user "internally".

In accordance with an important aspect of the present invention, each user in the system is provided a user identification number which is prime (i.e, having no positive integer factors other than one and itself). It will be appreciated that a unique prime user identification number (PUID) may be assigned to a user directly as his login or may be mapped to a user's unique password (or UID). In the latter case, the CPU 11 of the operating system 10 will include a translation device 18, which consists of a mapping table or other conventional mapping device.

Another important feature of the present invention is that a prime-product access code (AC) is provided for each available mode of access to each secure object. More specifically, the access code assigned to a particular object/mode comprises an integer value which is a product of the PUIDs of all system users having the same access rights to that object and mode. For example, if three users (whose PUIDs are 3, 7 and 17, respectively) are to be the only users having READ mode access to a particular secure data file, the READ access code ($AC_R$) for that secure data file should include an integer value of 357 (the product of the prime numbers 3, 7 and 17).

It should be noted that in accordance with the present invention, the access code for an object/mode may comprise a negative integer value whose absolute value is a product of the PUIDs of all system users who are to be denied access to that mode. This implementation is particularly useful when a small set of users is to be denied access, but most users are allowed access. An example of this situation is a secure data file having $AC_R = -345$, such that only the users assigned PUIDs 3, 5 and 23 are to be denied READ mode access to the file.

In other words, the phrase "users having the same access rights", as used herein, applies equally to either a group of users who are to be granted access to an object/mode or a group of users who are to be denied access to an object/mode.

It will be appreciated that the access codes of this invention may be more efficiently stored in the inodes for the respective secure objects than the access control lists of "classical" access control systems. Obviously, it is more efficient spacewise to store one large integer than a matrix or list of integer values. Since the "classical" individual file or user-based lists are necessarily of indeterminate size, it is essentially impossible to reserve memory space for them in advance. Rather, these lists are usually stored on an offline device, such as a disk, which is roughly an order of magnitude slower to read than online memory.

In comparison, the access codes (ACs) utilized in the operating system of this invention can usually be stored in one, 64-bit integer location. This small (and predictable) size allows the access control information to be stored in the inode for an object, which may look as follows:

disk address: (address)
last access time: (time)
last write time: (time)
owner: (integer: PUID)
size: (size)
permissions:
    READ: (integer: $AC_R$)
    WRITE: (integer: $AC_W$)
    EXECUTE: (integer: $AC_X$)

All of the access control information may, therefore, be read into memory along with the inode. Accordingly, extra disk reads are not necessary, as in the "classical" implementations. It follows, of course, that the access control procedure may be more quickly completed in the inventive operating system.

In accordance with this invention, only the operating system allows access to the files. As such, access control mechanisms within—i.e., procedures followed by—the operating system serve as protection against unauthorized access. Due to the arrangement of prime user identification numbers (PUIDs) and access codes (ACs) comprising products of the PUIDs of all users having the same access rights to the associated object/mode, the procedure followed by the inventive operating system to evaluate user access requests and generate responsive access control signals is very simple (and fast). Since an AC is factorable only by the unique set of PUIDs (prime integers) used to create it, only those PUIDs can be evenly divided into the AC integer value. Thus, the procedure needed to make an access permission evaluation is reduced to a simple mathematical calculation, known as a modulo operation. A modulo operation, simply explained, returns the remainder of a division. For example, if we represent the modulo operator by "%", it follows that 15% 7 = 1 (since 15 ÷ 7 = 2 with a remainder of 1).

It should be noted that if the modulo operator is not available in a given CPU instruction set, the modulo operation can be simulated either by repeated subtractions or by performing a divide-multiply-compare sequence of operations.

In accordance with the present invention, therefore, the operating system performs the following simple modulo operation:

$$AC \% PUID = \text{remainder}$$

If the remainder of this modulo operation is zero (0), then the PUID of the requesting user divides evenly into the access code (AC) for the requested object/mode and is one of the AC's unique factors. Accordingly, if the AC is a positive integer, and the modulo operation returns a zero remainder, access should be allowed. If, however, the modulo operation returns a non-zero remainder when the access code is a positive integer, access should be denied.

On the other hand, if the access code of the requested object/mode is a negative integer other than −1 (−1 is a special case which will be discussed further hereinafter), access should be granted if a non-zero modulo remainder is returned and should be denied upon return of a modulo remainder of zero. This is so because, as discussed previously, an AC has a negative integer value when it is used to represent the product of the PUIDs of all users who are to be denied access to the object/mode.

In short, the present invention provides a simple and efficient access control system. Matrix look-up or list searching, the methods used in the "classical" access control implementations, are replaced by a simple mathematical (modulo) operation. Whereas the "classical" implementations required the steps of calculating an address into the matrix, reading the location and examining the contents at the location, the method provided by this invention requires only calculating the modulo of the PUID and AC values and comparing it to zero. Thus, the savings in computation time is significant.

Several other implementation details are also easily handled in the system provided by the present invention. One of these is the capability of allowing the system administrator access to all objects. Since one (1) is a factor of all positive integers, it will serve as a successful key for all ACs. Therefore, the administrator login is assigned a PUID of value 1.

Another common feature of access control is an indicator for some objects that no restrictions (i.e., no access control) is required. In the AC/PUID implementation, it is possible to use the special case of zero (0) as the access code for all objects/modes which are to have "open" access permissions. Thus, for example, if the EXECUTE access code ($AC_X$) for an object has a value of zero, then all users are allowed access to the EXECUTE mode for that object.

Conversely, to provide "closed" permissions for an object/mode (i.e., no one is allowed access), an AC value is needed that is not divisible by any of the PUIDs. The value one (1) meets this goal, and yet retains the notion that administrative access is still allowed (using the administrator PUID of 1).

Figure 3:
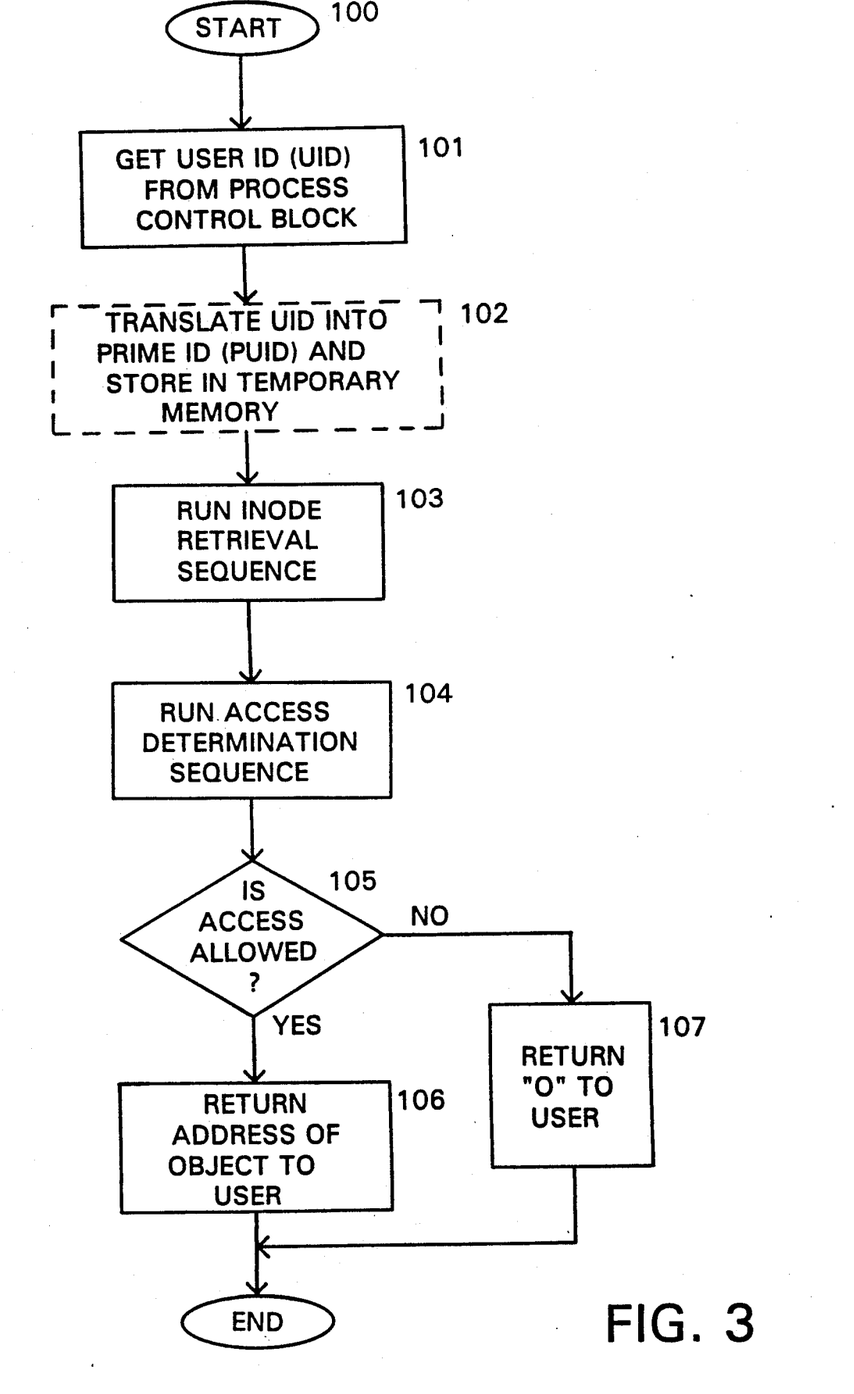
FIG. 3 is a flowchart representation of the sequence of operations followed by the inventive operating system in controlling access to the secure objects.
Figure 4:
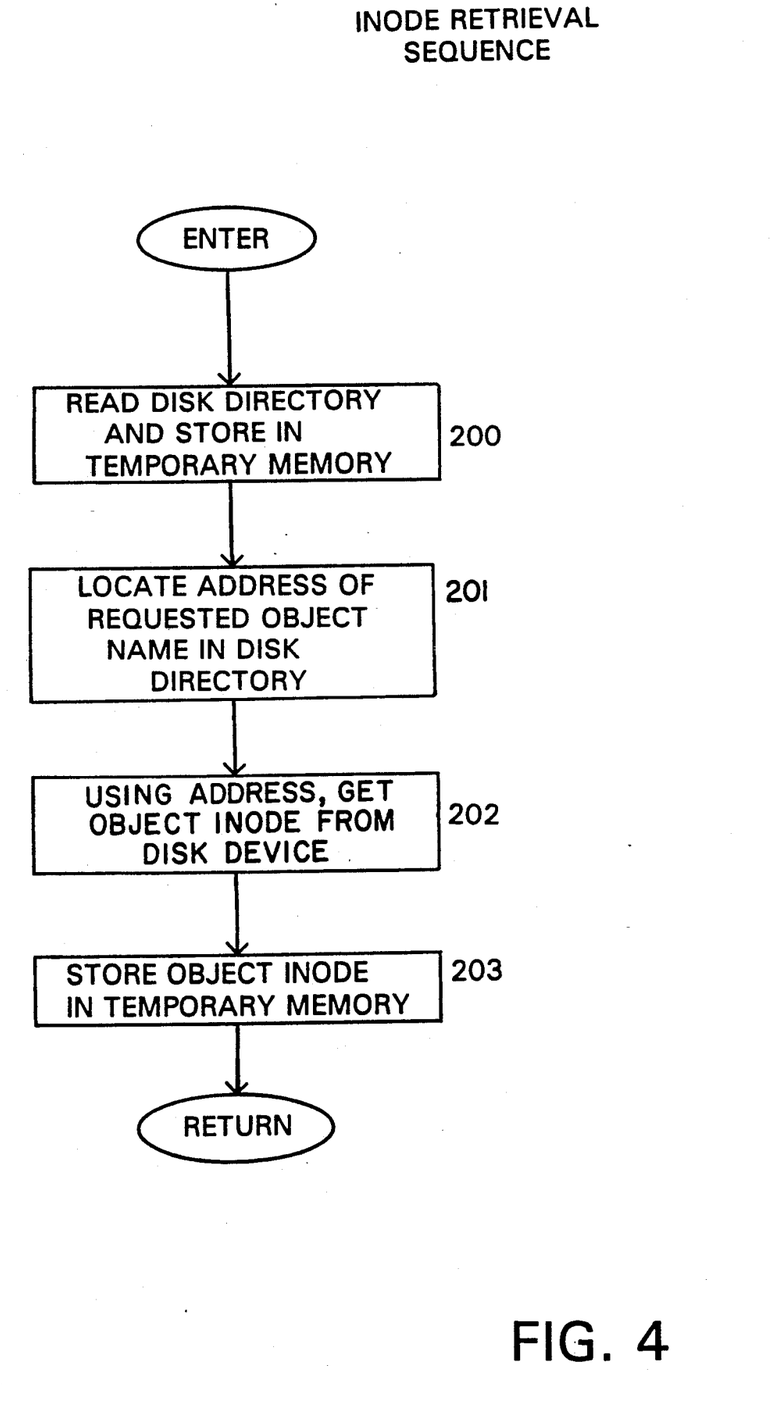
FIG. 4 is a flowchart representation of the inode retrieval sequence of FIG. 3.
Figure 5:
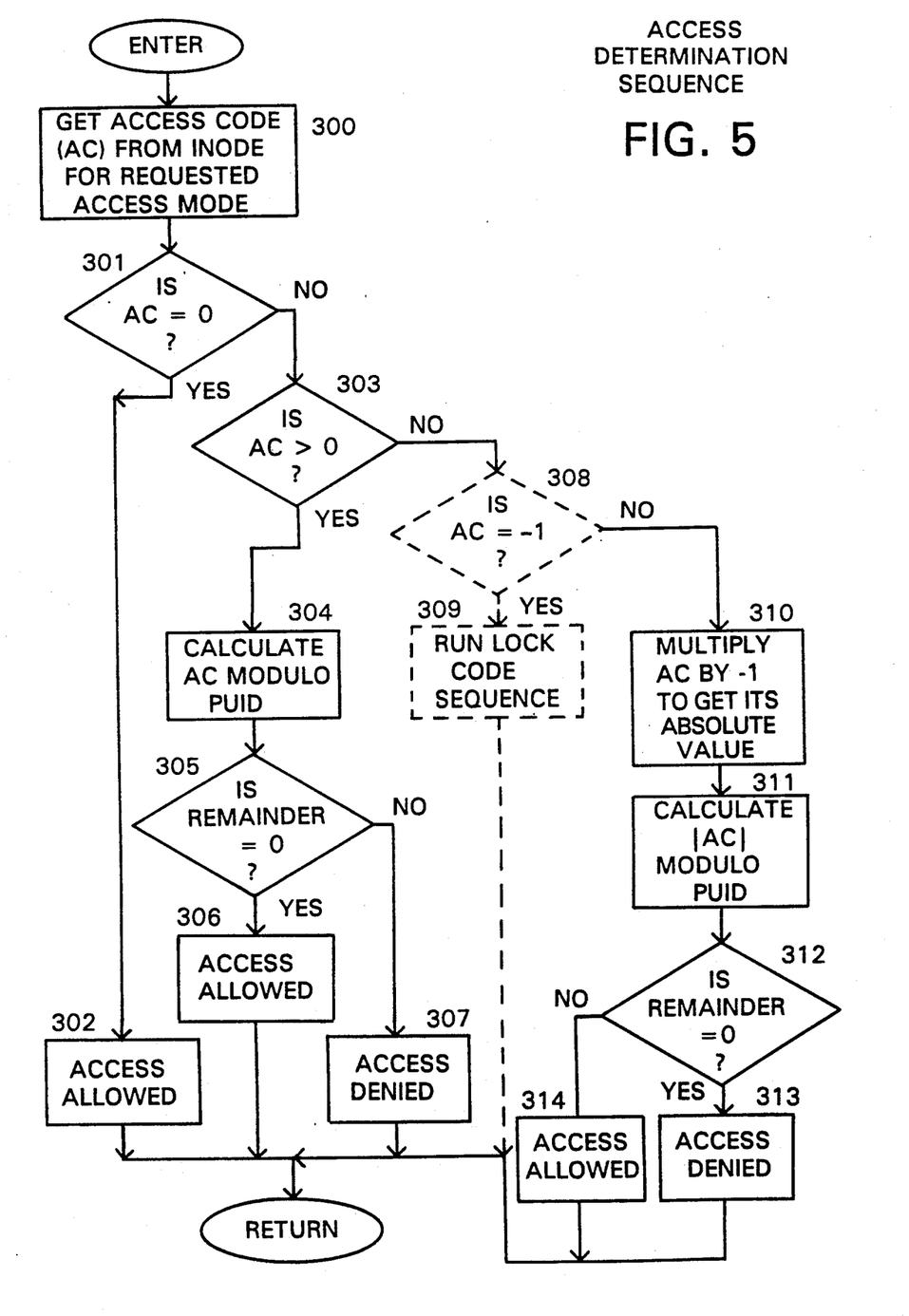
FIG. 5 is a flowchart representation of the access determination sequence of FIG. 3.

Referring now to FIGS. 3 through 5, there is shown a flowchart representation of the sequence of operations followed by a preferred embodiment of the inventive operating system in providing access control. More specifically, and with reference to the flowchart representation of FIG. 3, the access control procedure performed within the operating system begins (at step 100) when a user makes a request for access to a particular object/mode.

At step 101, the CPU 11 gets the user's identifier (UID) or password from the process control block 13a in the temporary memory 13. If the UID or password is not prime, it is translated by the translation device 18 into its associated PUID and stored in temporary memory (step 102).

Once this has been accomplished, the inode retrieval sequence is initiated (step 103), which involves getting the inode for the requested object. This sequence is described in detail with reference to FIG. 4. The first step 200 of this sequence entails reading the disk directory 14a in long term memory 14 and storing it in temporary memory 13. Next, the address of the requested object's name (or identifier) is located in the disk directory (step 201). Using the appropriate address, the CPU 11 then gets the inode for the requested object from the disk device 16 (step 202). The information comprising the inode for the requested object is stored in the temporary memory 13, thus ending the inode retrieval sequence.

Returning to the main operating sequence (FIG. 3), the access determination sequence is now initiated (step 104). This sequence, described in detail with reference to FIG. 5, involves evaluating the user's request and generating signals to either grant or deny access to the requested object/mode. At step 300, the access code (AC) corresponding to the requested mode for the object is taken from the retrieved inode data stored in temporary memory 13. More specifically, $AC_R$ is picked if the user wishes to have READ access to the object, while $AC_W$ or $AC_X$, respectively, will be chosen if the user wants to have WRITE or EXECUTE access.

At step 301, the logic unit 15 determines whether the access code has a value of zero (0)—i.e., indicating "open" access. If so, the CPU 11 generates a signal S granting the user access to the requested object/mode (step 302). On the other hand, if AC is not zero, a determination is made at step 303 by the logic unit 15 whether the value of AC is greater than zero.

If AC > 0, the integer value of AC is a product of the PUIDs of all users who are to be granted access to the respective object/mode. At step 304, a modulo operation is performed by the modulo device 15a using AC and the requesting user's PUID to determine the resulting remainder. The remainder is evaluated at step 305. If the remainder value is zero, then the user's PUID is a factor of the access code and access to the requested object/mode is allowed (step 306). However, if the remainder is not zero, access is denied (step 307).

On the other hand, if it is determined at step 303 that the value of AC is not greater than zero, an optional step 308 may be taken to check for a special case where AC=−1. This special case indicates that lock codes (LC1, LC2 . . . LCN) have been used, and a lock code sequence is initiated (step 309). This special arrangement may be used when the value of an access code (AC) will exceed the system's storage allocation, and will be described in greater detail later.

If the access code value is less than zero (and assuming the AC=−1 special case does not apply), the absolute value of the negative access code is obtained at step 310 by multiplying AC by −1. Next (step 311), a modulo operation is performed using the absolute value of AC and the user's PUID. The modulo remainder is evaluated at step 312 to determine whether access to the requested object/mode should be granted or denied. As discussed previously, a negative AC value defines the product of the PUIDs of all users who are to be denied access to the object/mode. Consequently, if the remainder evaluated at step 312 has a value of zero (indicating that the user's PUID is a factor of the negative AC value), access to the object/mode is denied (step 313). Conversely, if the remainder has a non-zero value, access is allowed (step 314).

Upon completion of the access determination sequence, the operating system evaluates the determination of the access determination sequence (step 105 of FIG. 3). If the user is to be allowed access to the object/mode, the operating system returns the address of the object to the user (step 106), thus enabling access. On the other hand, if the user is to be denied access, the system returns a value of zero (0), or some other predefined error code, to the user (step 107) to prevent access.

The return of either the requested object's address or zero completes the sequence of operations followed by the operating system in evaluating and responding to a user's access request. This same sequence is, of course, repeated for every request received from any of the plurality of system users.

As mentioned previously, an optional lock code feature can be easily utilized with the present invention to accommodate the special situation where the value of an access code exceeds the operating system's inode storage allocation (e.g., 64 bits). For example, this could occur in a system having 1000 active users if the fifty users having the highest PUIDs wanted to share access to some object, such as a file. In that situation, means for storing very large AC values would be required.

To meet this special need, a special AC area is allocated in an external memory (not shown) owned by the operating system. This area (or "lock block") must be of a size large enough to store many ACs. Secondly, the value −1 is stored in the AC field of the inode for the object/mode, thereby indicating that the access code is stored in the external memory "lock block". Finally, two or more lock codes (LC1, LC2 . . . LCN) are calculated from the PUIDs of the users who are to have access to the object/mode, and these lock codes are stored sequentially in the lock block. The final lock code is assigned a value of −1, thus indicating the end of the block. As a whole, the lock codes form a set of ACs for the object/mode.

With this arrangement in place, a lock code sequence is initiated when it is determined (at step 308 of FIG. 5) that the access code field of the inode for the object/mode requested by a user contains a value of −1. The lock code sequence—shown in detail in the flowchart representation of FIG. 6—evaluates the user's request for access to that object/mode by performing modulo operations using the set of lock codes and the user's PUID. At step 400, the lock codes for the object/mode are obtained from the associated external memory. At step 401, a pointer is set (X=1) such that a first modulo operation is performed using the first lock code (LC1) and the requesting user's PUID (step 402). The remainder is evaluated at step 403 and access to the object/mode is allowed (step 404) if the remainder has a value of zero.

Figure 6:
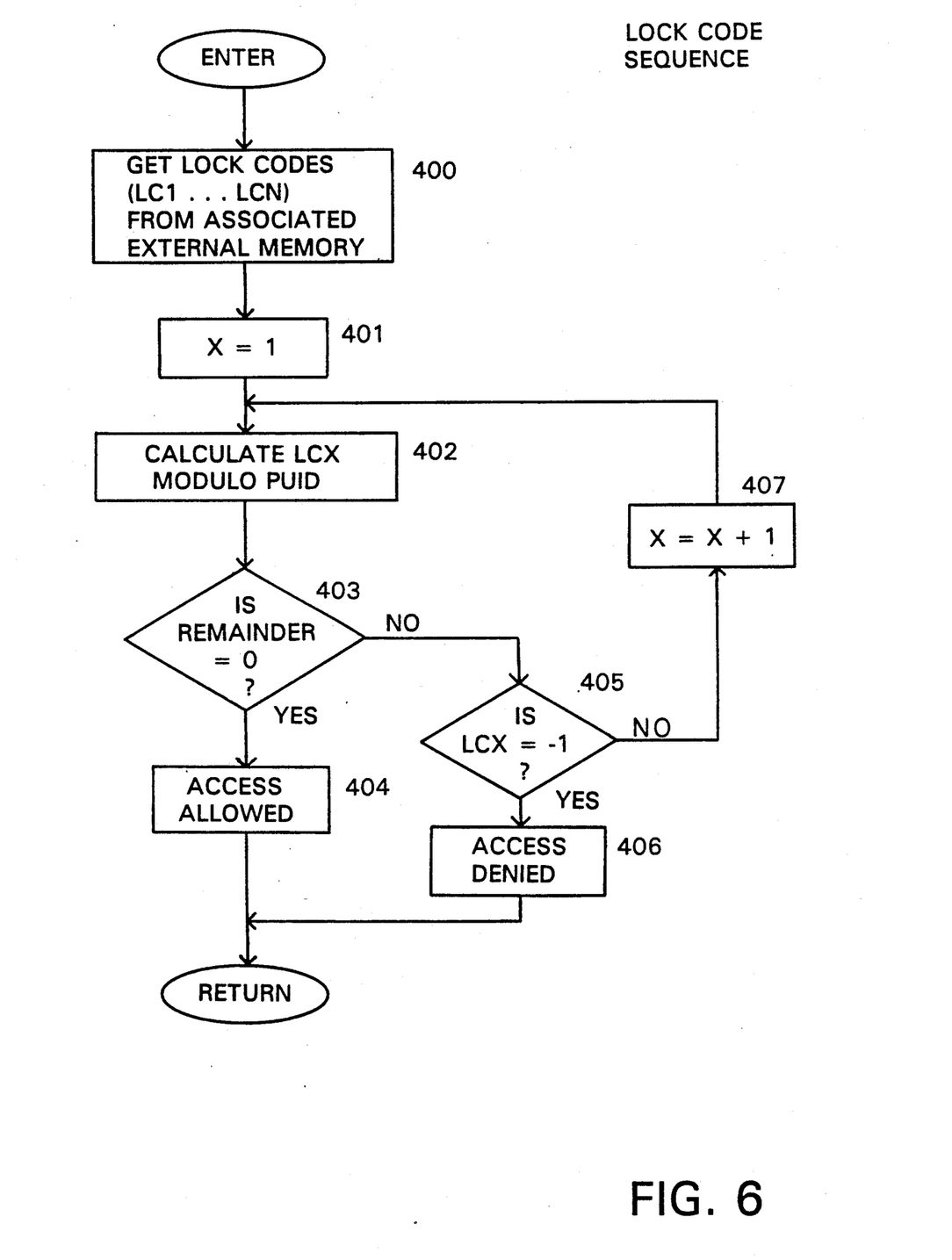
FIG. 6 is a flowchart representation of the lock code sequence of FIG. 5.

If the modulo operation performed on the first lock code renders a non-zero remainder, a check is made whether that lock code has a value of −1 (step 405). If it does, indicating that it is the final lock code in the set, access to the object/mode is denied (step 406). On the other hand, if it is not the last lock code, the X pointer is incremented (step 407) and the sequence reverts to step 402 to perform a second modulo operation on the second lock code (LC2). This same sequence is repeated time after time until either a modulo remainder of value zero is obtained (and access is allowed) or the final lock code having value −1 is encountered (and access is denied).

It is also easy in the operating system of the present invention to modify user access permissions to reflect desired system changes. Generally, to allow a user access to an object, the operating system simply multiplies the access code (AC) for that object by the PUID of the user and substitutes that product for the old AC. Similarly, in order to disallow a user's access to some object, the AC for that object is divided by the PUID of the user and the resulting quotient is used as the new AC for the object. Thus, through simple mathematical operations, the access control permissions can be efficiently modified.

Figure 7:
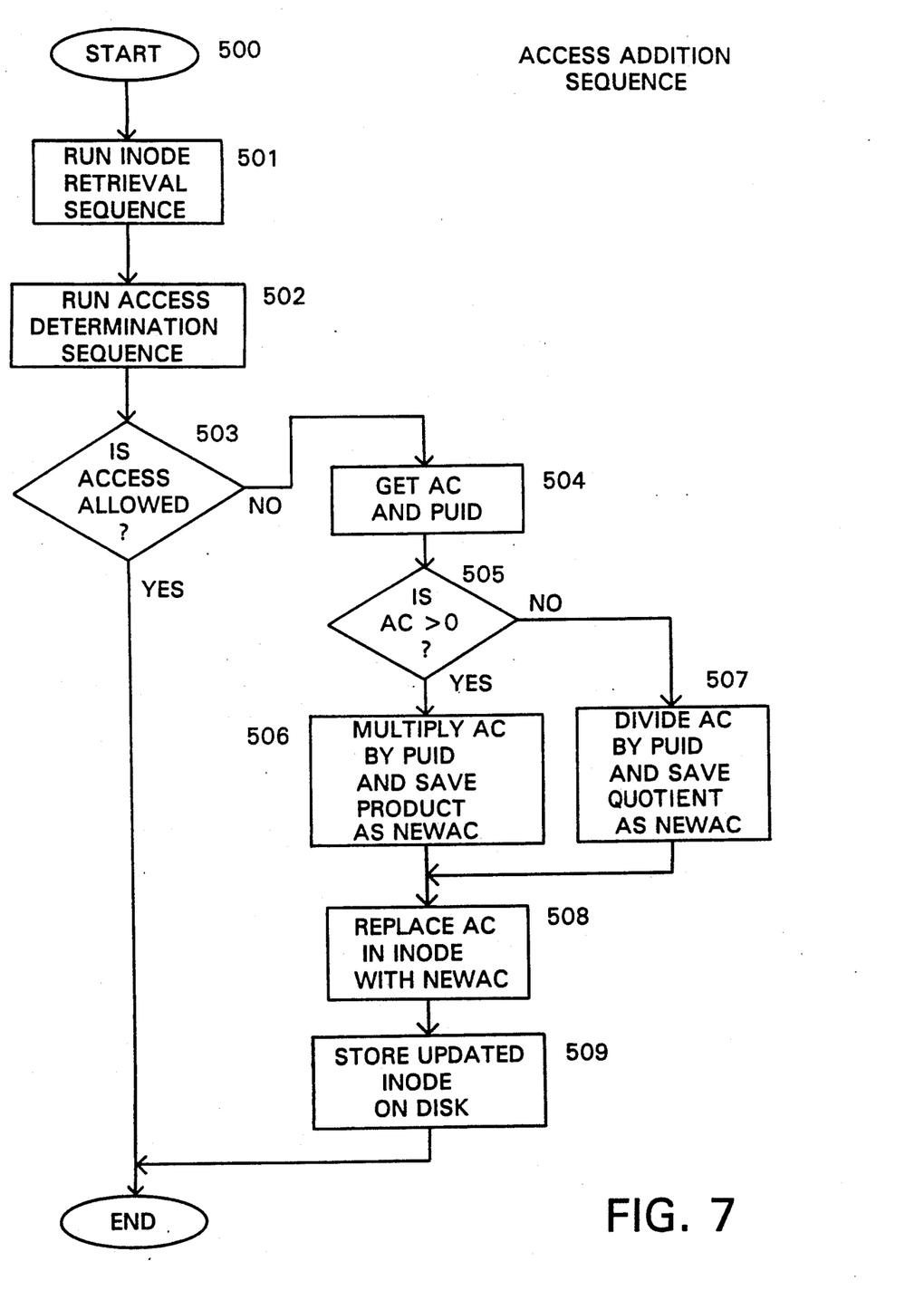
FIG. 7 is a flowchart representation of the sequence of operations followed by the inventive operating system in modifying the access permissions to a secure object.

The sequence for adding a user to an object's access list, for example, is shown in greater detail in FIG. 7. This sequence begins (at step 500) when an administrator or object owner requests that some other user be given access to a specific object/mode. At steps 501 and 502, the inode retrieval sequence and access determination sequences are run (as described previously). It is then determined whether the user already has access permission to the object/mode (step 503). If the user does not have access, as would be expected, the operating system stores the user's PUID and the access code (AC) for the object/mode in temporary memory (step 504). Next, at step 505, it is determined whether AC is a positive or negative integer. If AC is positive (indicating that it is the product of the PUIDS of all users having access), it is multiplied by the user's PUID and the product is saved as NEWAC (step 506). However, if AC is negative (indicating that it is the product of the PUIDs of all users who do not have access to the object/mode), it is divided by the user's PUID and the quotient is saved as NEWAC (step 507). The modified access code value (NEWAC) is then substituted into the inode for the object in place of AC (step 508), and the updated inode is stored on a disk for the object in the disk device 16 (step 509).

It will be appreciated that substantially the same sequence of operations can be used to delete a user from an object's access list. Specifically, reversing each of the steps 503 and 505 will provide the necessary sequence of operations for deleting access permissions.

As can be seen from the foregoing detailed description, the present invention provides an improved operating system for controlling access to secure objects.

The improved method used by this operating system requires minimal memory space and evaluates access requests very quickly and, thus, is inexpensive to use. Moreover, this improved access control method allows simple modification of access permissions and easy separation of user and administrator access. Finally, it is relatively inexpensive to implement this method because very little hardware is required.

What is claimed is:

1. A method of controlling access rights among a plurality of users to an operating system having a plurality of secure objects, comprising the steps of:

providing each user a user identification number which is prime;

providing at least one access code to each secure object, said access code comprising a value which is a product of the user identification numbers of all users having the same access rights to that secure object;

responding to a request by a particular user for access to a particular secure object by dividing the access code for that secure object by the user identification number of the requesting user; and determining access rights of the requesting user to the particular secure object based on whether the result of the division yields a zero remainder.

2. The method of claim 1 wherein each user is provided a prime user identification number by providing each user a respective password and using translating means to translate each password into a prime user identification number.

3. The method of claim 2 wherein the translating means comprises a memory device which maps a prime user identification number to each password.

4. The method of claim 1 further comprising the step of providing some objects with an access code of value zero to allow all requesting users access thereto.

5. The method of claim 1 wherein the dividing is done by performing a modulo operation.

6. The method of claim 1 wherein at least one secure object is provided an access code having a positive integer value which is the product of the user identification numbers of all users who are authorized to access that object, and the step of determining access rights includes granting the requesting user access to that object if the result of the division yields a zero remainder.

7. The method of claim 1 wherein at least one secure object is provided an access code having an integer value which is the negative of the product of the user identification numbers of all users who are not authorized to access that object, and the step of determining access rights includes denying the requesting user access to that object if the result of the division yields a zero remainder.

8. The method of claim 1 wherein at least one secure object is provided an access code having a value of −1 and that access code further comprises a plurality of lock codes, each lock code having a value which is a product of the user identification numbers of a respective portion of all users who are authorized to access that object, and wherein the responding step includes dividing each of the lock codes by the user identification number of the requesting user and the step of determining access rights includes granting the requesting user access to that object if the result of any of the lock code divisions yields a zero remainder.

9. The method of claim 8 wherein the dividing is done by performing modulo operations.

10. The method of claim 1 wherein the step of determining access rights includes granting the requesting user access to the particular requested object if the access code for that object has a positive value and the division yields a zero remainder.

11. The method of claim 1 wherein the step of determining access rights includes granting the requesting user access to the particular requested object if the access code for that object has a negative value less than −1 and the division yields a non-zero remainder.

12. An operating system having a plurality of secure objects wherein access rights among a plurality of users to the secure objects are selectively controlled, the system comprising the combination of:

identification means for providing each user a user identification number which is prime;

at least one access code provided for each secure object, each access code comprising a value which is a product of the user identification numbers of all users having the same access rights to that secure object;

means for responding to a request by a particular user for access to a particular secure object by dividing the access code for that secure object by the user identification number of the requesting user; and means for determining access rights of the requesting user to the particular secure object based on whether the result of the division yields a zero remainder.

13. The operating system of claim 12 wherein a password is provided for each user and the identification means comprises translating means for translating each password into a prime user identification number.

14. The operating system of claim 13 wherein the translating means comprises a memory device which maps a prime user identification number to each password.

15. The operating system of claim 12 wherein some objects have an access code of value zero to allow all requesting users access thereto.

16. The operating system of claim 12 wherein the responding means comprises means for performing a modulo operation.

17. The operating system of claim 12 wherein at least one secure object is provided an access code having a positive integer value which is the product of the user identification numbers of all users who are authorized to access that object, such that access to that object is granted to the requesting user if the result of the division yields a zero remainder.

18. The operating system of claim 12 wherein at least one secure object is provided an access code having an integer value which is the negative of the product of the user identification numbers of all users who are not authorized to access that object, such that access to that object is denied to the requesting user if the result of the division yields a zero remainder.

19. The operating system of claim 12 wherein at least one secure object is provided an access code having a value of −1 and that access code further comprises a plurality of lock codes, each lock code having a value which is a product of the user identification numbers of a respective portion of all users who are authorized to access that object, and wherein each of the lock codes is divided by the user identification number of the requesting user such that the requesting user is granted access to that object if the result of any of the lock code divisions yields a zero remainder.

20. The operating system of claim 12 further comprising means for modifying the access code provided for an object to accommodate changes to the set of users authorized to access that object.

21. A method of controlling access permissions among a plurality of users to a plurality of secure objects in an operating system, comprising the steps of:

providing each user a user identification number which is prime;

providing at least one access code number to each secure object, each access code number consisting of a value which is a product of a predetermined set of prime numbers; and altering the access permission of a particular user to a particular secure object by modifying the access code value for the particular secure object by a factor equal to the prime identification number of the particular user.

22. The method of claim 21 wherein the step of access permission altering is performed by multiplying the access code value for the particular secure object by the prime identification number of the particular user.

23. The method of claim 21 wherein the step of access permission altering is performed by dividing the access code value for the particular secure object by the prime identification number of the particular user.

* * * * *